(12) United States Patent
Knaak et al.

(10) Patent No.: US 7,160,096 B2
(45) Date of Patent: Jan. 9, 2007

(54) PERFORATION MECHANISM FOR A FOAM-IN-BAG CUSHION AND METHOD OF USE

(75) Inventors: Michael Knaak, New Fairfield, CT (US); Andy Tyler, Southbury, CT (US); Dave Carson, Mahopac, NY (US); Daniel C. George, Tarrytown, NY (US)

(73) Assignee: Sealed Air Corporation, Saddle Brook, NJ (US)

( * ) Notice: Subject to any disclaimer, the term of this patent is extended or adjusted under 35 U.S.C. 154(b) by 402 days.

(21) Appl. No.: 10/692,579

(22) Filed: Oct. 24, 2003

(65) Prior Publication Data

US 2005/0087048 A1 Apr. 28, 2005

(51) Int. Cl.
*B26F 1/24* (2006.01)

(52) U.S. Cl. ............................ 425/290; 83/660; 83/665

(58) Field of Classification Search .................... 83/30, 83/660, 665; 425/290
See application file for complete search history.

(56) References Cited

U.S. PATENT DOCUMENTS

| | | | |
|---|---|---|---|
| 3,073,304 A | 1/1963 | Schaar | |
| 3,126,777 A | 3/1964 | Shabram | |
| 3,302,501 A | 2/1967 | Greene | |
| 3,420,421 A | 1/1969 | Hellberg | |
| 3,546,742 A | 12/1970 | Kugler | |
| 3,718,059 A | 2/1973 | Clayton | |
| 3,994,209 A * | 11/1976 | Jacob | 493/28 |
| 4,167,131 A | 9/1979 | Habas et al. | |
| 4,653,363 A | 3/1987 | Lang | |
| 4,655,028 A * | 4/1987 | Silbernagel | 53/399 |
| 4,856,396 A | 8/1989 | Brinkmeier et al. | |
| 5,105,227 A * | 4/1992 | Kitamura et al. | 399/317 |
| 5,376,219 A | 12/1994 | Sperry et al. | |
| 5,386,752 A | 2/1995 | Siegel | |
| 5,554,250 A | 9/1996 | Dais et al. | |
| 5,679,208 A | 10/1997 | Sperry et al. | |
| 5,802,945 A | 9/1998 | Brinkmeier et al. | |
| 6,131,375 A | 10/2000 | Sperry | |

FOREIGN PATENT DOCUMENTS

WO WO-95/24308 A1 9/1995
WO WO-97/38832 A1 10/1997

* cited by examiner

*Primary Examiner*—Allan R. Kuhns
(74) *Attorney, Agent, or Firm*—Alston & Bird LLP

(57) ABSTRACT

A perforation apparatus particularly useful for creating perforations in a foam-in-bag cushion and methods of using such apparatus are provided. The perforation apparatus is comprised of a frame, a main shaft mounted in the frame so as to be rotatable about a central axis, at least one needle roller coupled to the main shaft such that rotation of the main shaft moves the needle roller through a predetermined arc of motion out of and into an operative position adjacent to and perforating a plastic film advancing past the needle roller, and an actuator coupled with the main shaft and operable to rotate the main shaft so as to move the needle roller. Optionally, the apparatus is further comprised of at least one backup roller. Methods of preparing and perforating a foam-in bag cushion using the perforating apparatus are also provided.

29 Claims, 5 Drawing Sheets

PERFORATION MECHANISM FOR A FOAM-IN-BAG CUSHION AND METHOD OF USE

FIELD OF THE INVENTION

The present invention relates to a mechanism for creating perforations in the bag of a foam-in-bag cushion. In particular, the invention relates to a mechanism that is structured and arranged for attachment to a foam-in-bag cushion producing apparatus, wherein the mechanism is capable of creating perforations in the plies of the foam-in-bag cushions, at any point along the length of the cushions, wherein the perforations are capable of allowing gases to move into and out of the cushions while preventing foam formed in the cushions from escaping.

BACKGROUND OF THE INVENTION

Apparatuses for producing foam-in-bag cushions for use as packaging materials are generally known in the art. Such cushions are typically comprised of opposing sheets of plastic film having their edges sealed and being filled with a foam-forming material. The cushions are inserted into the packaging box immediately after their production where the foam is allowed to expand and harden, taking on the shape of the packaging container and the material being packaged.

Multiple patents exist describing such cushions as well as apparatuses and methods for their production. For example, U.S. Pat. No. 6,131,375 discloses an apparatus for successively forming foam cushions from two reactive foam components that, when mixed together, form an expandable foam, and from two opposing flexible panels that enclose the expandable foam. The apparatus advances two opposing film panels across a foam dispensing assembly so that the two panels are on opposite sides of the foam dispensing assembly, which separately dispenses the two reactive foam components into the space between the film panels where the components mix to form the foam. The marginal edges of the film panels are sealed, creating a foam-filled bag.

As the foam-forming composition used to fill the cushions reacts within the cushions, the reaction generates gases, such as carbon dioxide and water vapor, which lead to expansion of the foam and complete filling of the bag. Furthermore, air is drawn into the bag aiding in the expansion of the foam. It is therefore necessary to provide ventilation for the bag to allow the expanding gases to escape, and to allow air to be drawn into the bag. Without ventilation, the bag could be ruptured by the expanding foam. Additionally, lack of ventilation can lead to collapse of the foam or incomplete formation of the foam. Previous methods have been proposed for providing ventilation. According to U.S. Pat. No. 5,679,208, an apparatus is provided for forming a bag wherein the side seals do not extend the full length of the side, thus leaving vent openings in the sides. An alternate method for providing ventilation entails creating small slits in the bag using knives or heated wires.

Slit-formation is a method for providing ventilation that is presently used with the SpeedyPacker™ foam-in-bag packaging system available from Sealed Air Corporation (Saddle Brook, N.J.). While ventilation using slit-forming mechanisms is effective at allowing formed gases to escape, the slits have the disadvantage of being large enough in size to allow foam to escape the bag, especially with small size applications, such as continuous foam tubes (CFTs). This is problematic in that the cushions are generally placed in contact with the material to be packaged to allow the cushion to take on the shape of the packaged material. It is undesirable to allow foam escaping the bag to make contact with the packaged materials.

It has been proposed that the problems associated with using slit vents can be alleviated through the use of needle rollers to create an area of pinhole vents in the foam-filled bags. Needle rollers have been used with foam-in-bag cushion producing apparatuses, such as the SpeedyPacker™ system, and have been shown to be effective at providing ventilation while preventing the escape of foam from the bags. Placement of a needle roller in the SpeedyPacker™ system allows for continual venting of the film used to create the bags; however, the current system is limited by its reliance on manual alteration of the system. In other words, with the needle roller in place, vents are always being made, with no variation in the pattern or number of vents created. Further, if it is necessary to create bags without ventilation, the bag-making apparatus must be shut down, the needle roller must be manually removed, and the apparatus must be restarted to begin producing more cushions. Further, vented bags cannot again be made without again shutting down the apparatus and manually replacing the needle roller. This presents a problem not only in that it is an inconvenience for the machine operator, but also in the lost production time and decreased efficiency associated with such necessary manual changes, and the inherent danger to the machine operator in having to continually remove and replace working pieces of the machinery.

Therefore, it would be advantageous to have a mechanism structured and arranged for attachment to a foam-in-bag cushion producing apparatus, such as the SpeedyPacker™, capable of creating perforations in the bag in an automated fashion, such that the mechanism can accommodate any type of bag, at any time, and in any combination. Such advantages are provided by the perforation forming mechanism of the present invention.

BRIEF SUMMARY OF THE INVENTION

The present invention addresses the above needs and achieves other advantages. In one embodiment of the invention, an apparatus for perforating an advancing plastic film comprises a frame, a main shaft mounted in the frame so as to be rotatable about a central axis, at least one needle roller, and an actuator. The needle roller is coupled to the main shaft in a radially offset position such that rotation of the main shaft through a part of a revolution moves the needle roller through a predetermined arc of motion. Further, the needle roller is arranged to be freely rotatable about its axis, independently of the rotation of the main shaft. The actuator is coupled with the main shaft and is operable to rotate the main shaft so as to move the needle roller between an operative position and an inoperative position. The needle roller is in the inoperative position at one end of the arc of motion when it is positioned away from the advancing plastic film and is in the operative position at the opposite end of the arc of motion when it is positioned adjacent to the plastic film, engaging and perforating the film. The apparatus can further comprise a backup roller mounted in the frame so as to be freely rotatable about the axis of the backup roller. The backup roller is radially offset from the main shaft and positioned with respect to the predetermined arc of motion of the needle roller such that when the needle roller is in the inoperative position, the needle roller is positioned away from the backup roller, and when the needle roller is in the operative position, the needle roller is adjacent the backup roller so as to form a nip. The advancing film passes through the nip, wherein when the needle roller being in the operative position engages the advancing film against the backup roller, the needle roller perforating the advancing film. In particular, the perforating apparatus is structured and arranged for attachment to a foam-in-bag cushion production apparatus.

In a preferred embodiment of the present invention, there is provided an apparatus for creating perforations over a defined area through a moving foam-in-bag film at any point along the length of the film. Such apparatus comprises a pair of frame plates spaced apart opposite one another, a main shaft extending between the frame plates and mounted so as to be rotatable about a central axis of the main shaft, secondary shafts having central axes and being fixedly mounted to the main shaft in radially offset positions therefrom, needle rollers mounted on each of the secondary shafts so as to be freely rotatable about the secondary shafts, tertiary shafts cantilevered off each frame plate and having free ends, and backup rollers mounted on each of said tertiary shafts such that the backup rollers are freely rotatable about the tertiary shafts. Further, the apparatus also comprises means for rotating the main shaft so as to move the needle rollers between operative and inoperative positions in which the needle rollers are respectively in contact and out of contact with the backup rollers, whereby a film passing between the backup rollers and the needle rollers is perforated by the needle rollers when the needle rollers are in the operative position and is not perforated when the needle rollers are in the inoperative position. In particular, the perforating apparatus is structured and arranged for attachment to a foam-in-bag cushion production apparatus.

According to another aspect of the present invention, there is provided a method for preparing foam-in-bag cushions. The method comprises supplying at least one web of film, manipulating the at least one web of film to position two film portions in overlying opposition to each other, and sealing the two film portions along seal lines to form a bag open along one side and defining an interior space therein. The method further comprises injecting a foam-forming composition into the interior space of the bag, and sealing the film portions along the open side of the bag to enclose the foam-forming composition in the bag. Next, according to the method, the bag is perforated to form vents, wherein the perforating comprises the steps of advancing the at least one web of film between at least one freely rotatable backup roller and at least one freely rotatable needle roller supporting a plurality of pins for perforating the film, and moving the at least one needle roller from an inoperative position, spaced from the at least one backup roller such that the pins are disengaged from the film, into an operative position adjacent the at least one backup roller such that the pins engage the film and perforate the film. Additionally, the perforating step can be interrupted by moving the at least one needle roller from the operative position to the inoperative position, which moving can be fully automated and conducted in synchronism with the advancement of the film so as to position the vents in the film in a predetermined location with respect to the bag.

According to yet another aspect of the present invention, there is provided a method for perforating a foam-in-bag cushion. The method comprises supplying at least one web of film, manipulating the at least one web of film to position two film portions in overlying opposition to each other, and sealing the two film portions along seal lines to form a bag open along one side and defining an interior space therein. The method further comprises injecting a foam-forming composition into the interior space of the bag, and sealing the film portions along the open side of the bag to enclose the foam-forming composition in the bag. Next, according to the method, the bag is perforated to form vents, wherein the perforating comprises the steps of advancing the at least one web of film between at least one freely rotatable backup roller and at least one freely rotatable needle roller supporting a plurality of pins for perforating the film, and moving the at least one needle roller from an inoperative position, spaced from the at least one backup roller such that the pins are disengaged from the film, into an operative position adjacent the at least one backup roller such that the pins engage the film and perforate the film.

DESCRIPTION OF THE DRAWINGS

Figure 1:
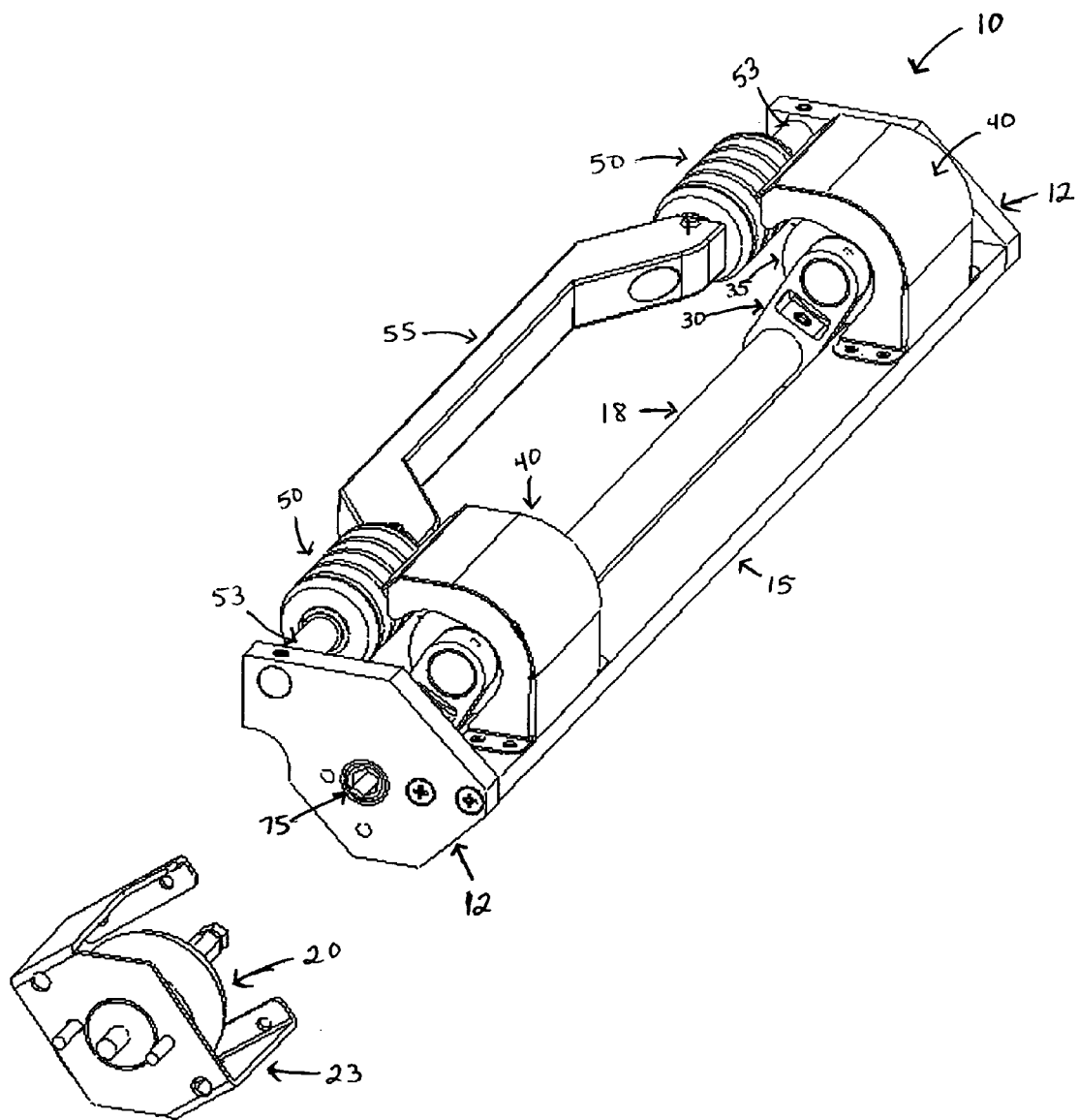
Figure 2:
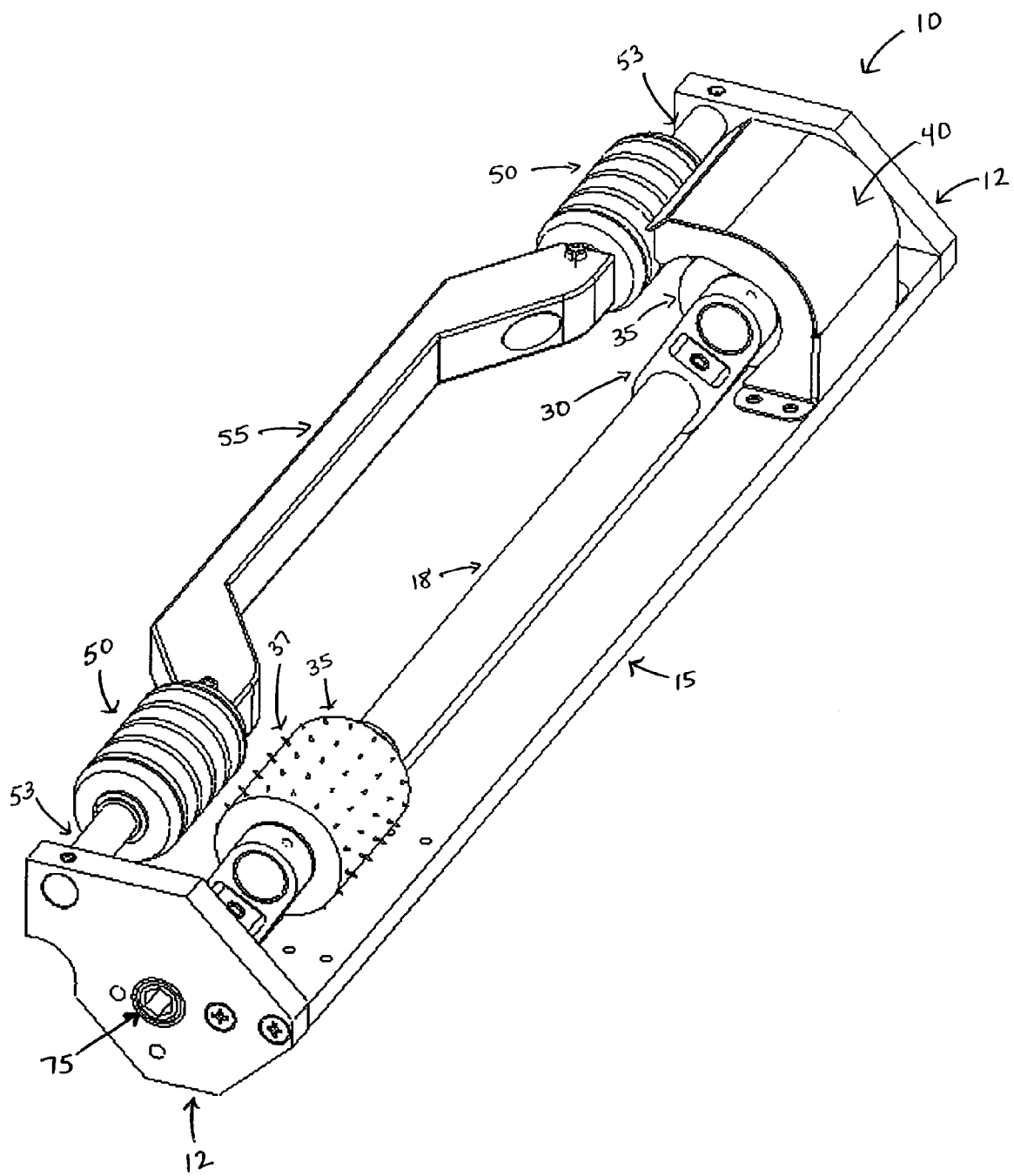
Figure 3:
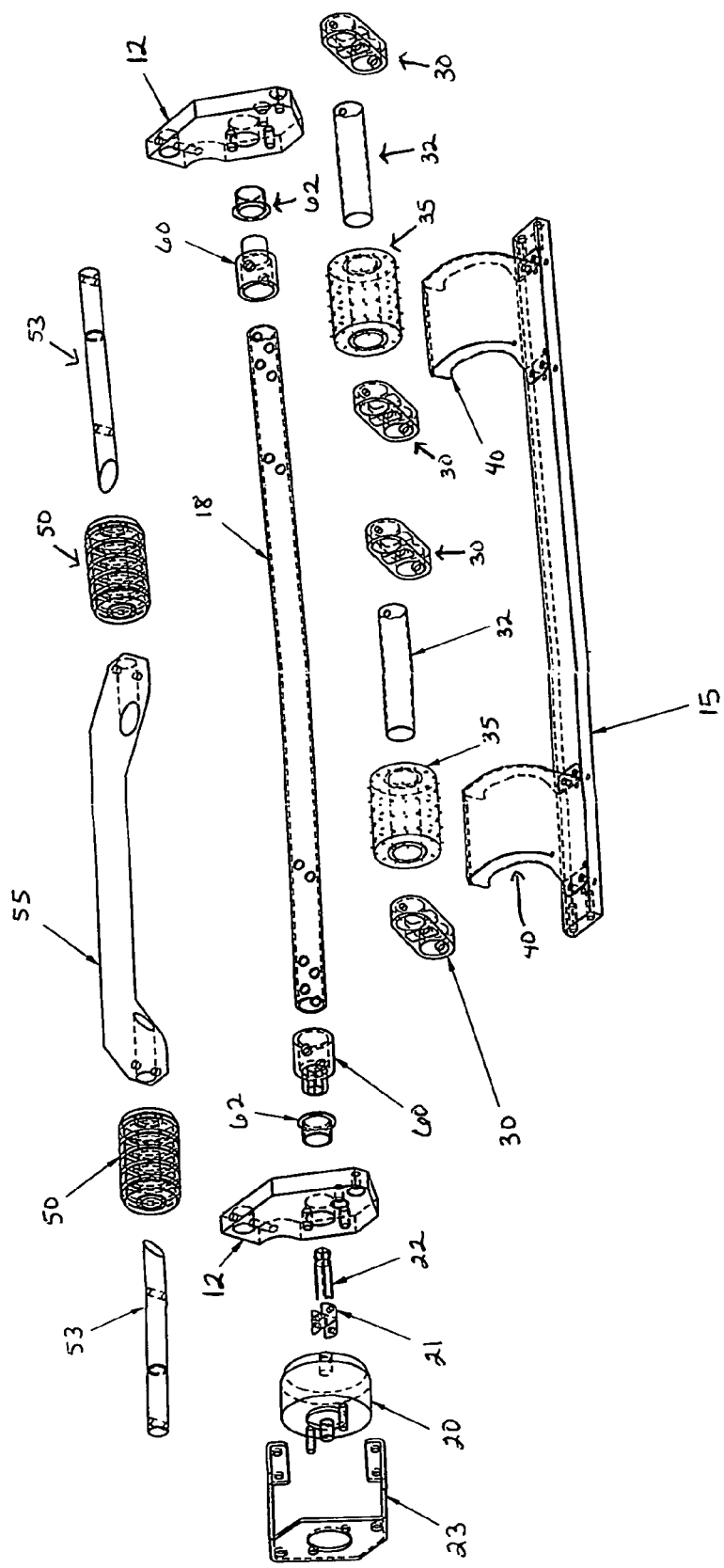
Figure 4:
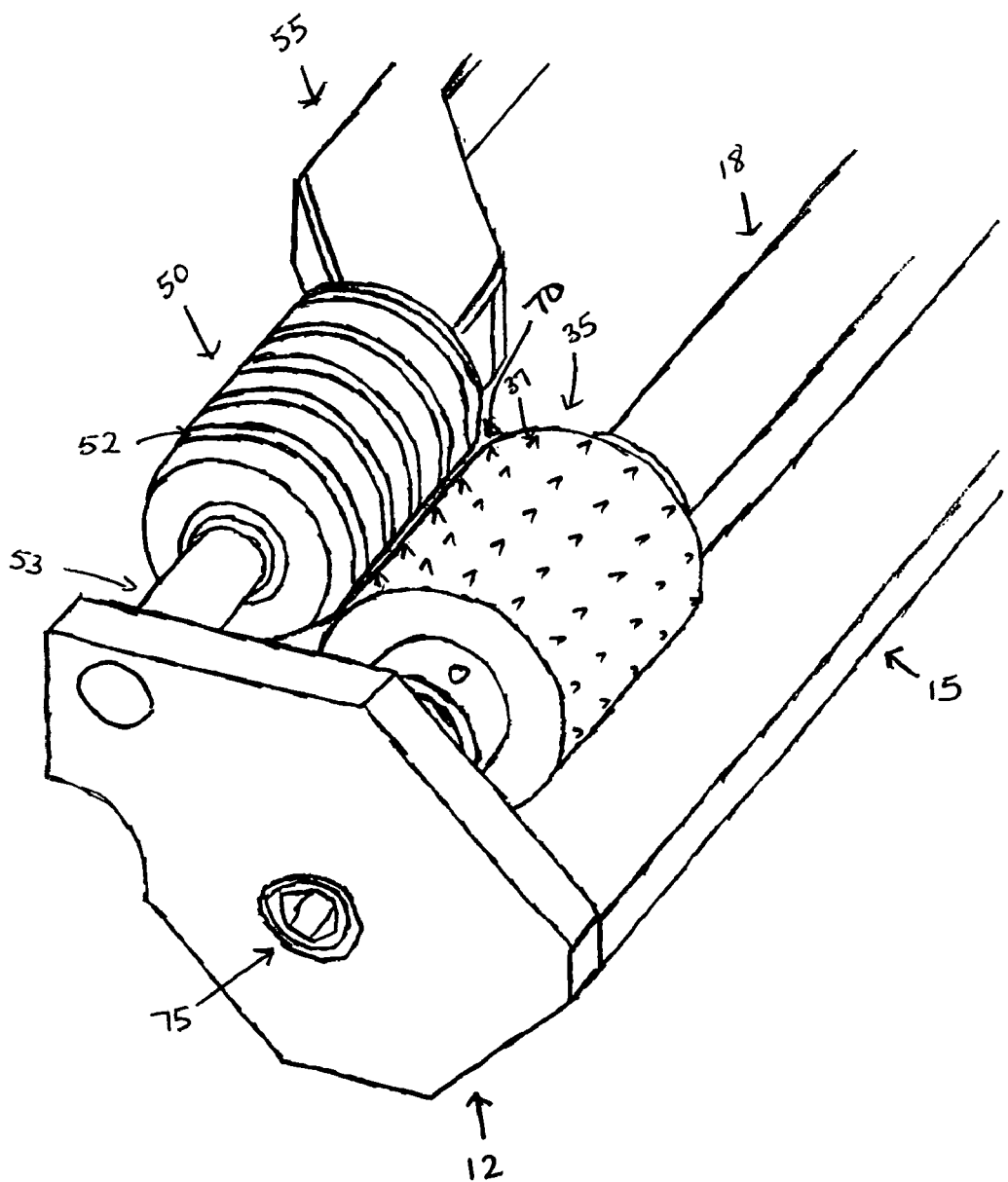
Figure 5:
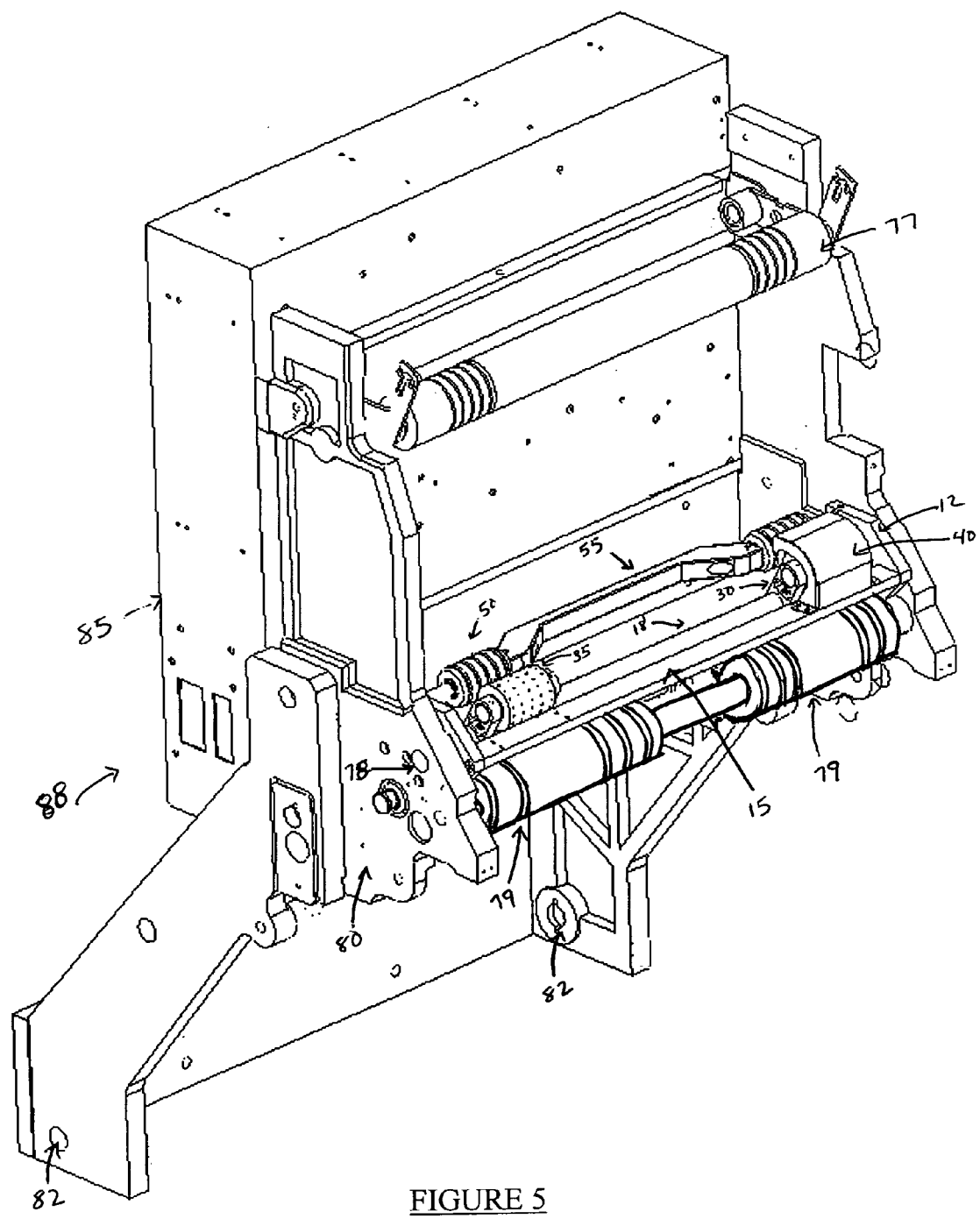

Having thus described the invention in general terms, reference will now be made to the accompanying drawings, which are not necessarily drawn to scale, and wherein:

FIG. 1 is an overall perspective view of a perforating apparatus in accordance with one embodiment of the invention;

FIG. 2 is another perspective view, similar to FIG. 1, but with a needle roller cover removed to reveal a needle roller;

FIG. 3 is an exploded schematic view of the apparatus revealing additional detail of the apparatus;

FIG. 4 is an enlarged partial perspective view of the perforating apparatus in the operative position wherein the needle roller is engaging the backup roller; and FIG. 5 is an overall perspective view of a foam-in-bag cushion making apparatus onto which a perforation apparatus according to the present invention has been installed (with some of the working parts of the foam-in-bag cushion making apparatus being removed for clarity of view of the perforation apparatus).

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In reference to FIGS. 1 through 3, a perforating apparatus 10 in accordance with one embodiment of the present invention is depicted. The apparatus 10 generally comprises a frame on which the remaining portions of the apparatus can be mounted. The frame can consist of a pair of frame plates 12 that are advantageously structured for mounting the remaining portions of the apparatus 10 and for allowing the apparatus 10 to be structured and arranged for attachment to an additional apparatus wherein a perforating mechanism would be useful, such as a foam-in-bag cushion production apparatus. Optionally, the frame plates 12 can be connected through use of a support bar 15, which ties the frame plates 12 together and provides additional rigidity to the frame.

The apparatus 10 is further comprised of a main shaft 18 mounted in the frame, preferentially between the two frame plates 12. The main shaft 18 is mounted so as to be rotatable about a central axis extending the length of the main shaft 18. Coupled to the main shaft 18, in a radially offset position, is at least one needle roller 35. The needle roller 35 is partially obstructed from view in FIG. 1 by a needle roller cover 40; the needle roller 35 is visible in FIG. 2, which shows a perspective view of the apparatus 10 with a needle roller cover 40 removed, and in FIG. 3, which provides an exploded schematic view of the apparatus 10. The needle roller cover 40 limits physical contact with the needle roller 35 by persons interfacing with the apparatus 10, thereby reducing the risk of possible injury by contact with the needle roller 35. The needle roller cover 40 provides protection when the needle roller 35 is in the operative position, the inoperative position, and at all points in between. The needle roller 35 is coupled to the main shaft 18 such that rotation of the main shaft 18 about its axis through part of a revolution moves the needle roller 35 through a predetermined arc of motion. The needle roller 35 is arranged such that it is freely rotatable about an axis extending the length of the needle roller 35, and such that its rotation is independent of the rotation of the main shaft 18.

According to one preferred embodiment of the invention, the needle roller 35 is coupled to the main shaft 18 by being mounted on a secondary shaft 32 such that the needle roller 35 is freely rotatable about the secondary shaft 32. The secondary shaft 32 is attached to the main shaft 18 with a pair of needle roller attachment arms 30, which are fixedly mounted to the main shaft 18, extending radially outward from the axis of the main shaft 18. The needle roller 35 is mounted on the secondary shaft 32 between the needle roller attachment arms 30, which keep the needle roller 35 on the secondary shaft 32 while allowing the needle roller 35 to rotate freely about the secondary shaft 32. The secondary shaft 32 is coupled to the main shaft 18 by the arms 30 such that an axis extending the length of the secondary shaft 32 is parallel with the axis of the main shaft 18, but in an offset fashion. The secondary shaft 32 preferably is not able to rotate about its axis. In one particularly preferred embodiment, the apparatus 10 is comprised of two needle rollers 35 mounted on two secondary shafts 32 coupled to the main shaft 18 with two sets of needle roller attachment arms 30. According to this embodiment, the needle rollers 35 can be coupled to the main shaft 18 so as to be symmetrically spaced about a given point of the axis of the main shaft 18, or the needle rollers 35 can be specifically spaced asymmetrically along the axis of the main shaft 18. Further, the arms 30 attach the secondary shafts 32 to the main shaft 18 such that the axes of the secondary shafts 32 are always in line with one another. The needle roller 35 has a substantially cylindrical body with a central bore extending the length of the needle roller 35, parallel with the axis of the needle roller 35. Extending outward radially from the body of the needle roller 35 are pins 37, which are preferentially tapered outward from the body of the needle roller 35.

The apparatus 10 can also be comprised of at least one backup roller 50 mounted in the frame so as to be freely rotatable about an axis extending the length of the backup roller 50. The backup roller 50 is positioned parallel to the main shaft 18 and is radially offset from the main shaft 18 to be positioned with respect to the predetermined arc of motion of the needle roller 35 such that at one end of the arc of motion, the needle roller 35 is positioned in an inoperative position spaced away from the backup roller 50. At the opposite end of the arc of motion, shown in detail in FIG. 4, the needle roller 35 is positioned such that it is in an operative position, adjacent to the backup roller 50, so as to form a nip 70 between the needle roller 35 and the backup roller 50. It is through this nip 70 that an advancing film passes, and the needle roller 35, being in the operative position, engages the advancing film, perforating the film.

According to one embodiment of the present invention, the apparatus 10 does not include a backup roller 50. In this embodiment, the advancing plastic film is directed along a path intersecting the predetermined arc of motion of the needle roller 35 corresponding to the operative position of the needle roller 35. Thus, the needle roller 35 is in the operative position when the needle roller 35 is at one end of the predetermined arc of motion, adjacent to and engaging the plastic film advancing along the intersecting path, and the needle roller 35 is in the inoperative position when the needle roller 35 is at the opposite end of the arc of motion, spaced apart from the plastic film. This embodiment is particularly advantageous in that when the backup roller 50 is not present, the needle roller 35, being in the operative position, exerts less pressure against the plastic film, thereby lessening the pass through of the pins 37 through the plastic film. Thus, when the plastic film is comprised of multiple plies, less than all of the plies are perforated upon advancement through the apparatus 10. For example, according to the embodiment, the apparatus 10 can be comprised of two needle rollers 35 and one backup roller 50 such that when the needle rollers 35 are in the operative position, the first needle roller 35 forms a nip 70 with the backup roller 50 and the second needle roller 35 does not form a nip 70 as there is not a second backup roller 50 with which the second needle roller 35 can form a nip 70. Thus, when the plastic film comprised of, for example, two plies advances past the needle rollers 35, both plies are perforated where the plastic film advances between the nip 70 formed between the needle roller 35 and the backup roller 50, but only one ply is perforated where the plastic film advances past the needle roller 35 without a corresponding backup roller 50.

According to another embodiment, the number of backup rollers 50 is equal to the number of needle rollers 35, and in a particularly preferred embodiment, there are two needle rollers 35 and two backup rollers 50. According to this embodiment, the backup rollers 50 are mounted on tertiary shafts 53, having an axis extending the length of the tertiary shafts 53. The backup rollers 50 are capable of freely rotating about the axis of the tertiary shafts 53, which are cantilevered off the frame plates 12 having free ends and cannot rotate about their own axis. Optionally, the free ends of the tertiary shafts 53 are joined together by a support bar 55, which adds rigidity and stiffness to the apparatus 10 as well as supporting the free ends of the tertiary shafts 53 holding the backup rollers 50.

As described above, the main shaft 18 is mounted so as to be rotatable about a central axis extending the length of the main shaft 18. Rotation of the main shaft 18 can be performed by any conventional means that would readily be ascertained by one of skill in the art, such as through manual means or automated means. According to one preferred embodiment, a rotary device is coupled to the main shaft 18. The rotary device could be, for example, an actuator, such as a motor or a solenoid. It is especially preferred that the actuator be a rotary solenoid 20, as shown in FIGS. 1 and 3. According to this embodiment, the main shaft 18 is mounted to the frame plate 12 with a shaft cap 60, which fits over the end of the main shaft 18 and into a hole in the frame plate 12. A shaft mounting gasket 62 can also be used according to this embodiment. The rotary solenoid 20 engages the main shaft 18 with a solenoid key shaft 22, which fits into a receiving socket 75 in the shaft cap 60, which extends through the frame plate 12.

The rotary solenoid 20 can be mounted to the frame of the perforating apparatus 10. In a preferred embodiment, however, the rotary solenoid 20 is mounted to the frame of the apparatus into which the perforating apparatus 10 is installed. Such mounting can be carried out through the use of a mounting bracket 23. For example, the perforating apparatus 10 can be installed as a unit on a foam-in-bag cushion production apparatus. FIG. 5 provides a perspective view of a foam-in-bag cushion apparatus onto which a perforation apparatus 10 of the present invention has been installed. The perforation apparatus 10 is structured and arranged to be capable of being installed onto various types of apparatuses used for preparing a plastic films, especially films wherein perforating of the films would be advantageous, particularly foam-in-bag cushion making apparatuses.

FIG. 5 illustrates a preferred embodiment wherein the perforation apparatus 10 is installed onto a SpeedyPacker™ foam-in-bag apparatus 88 (portions of the workings of the SpeedyPacker™, such as the means for delivering the foam-forming components, are removed to allow a better view of the installed perforating apparatus 10). The foam-in-bag apparatus 88 is comprised of a frame 80 onto which the components of the foam-in-bag apparatus 88 are installed. The frame 80 includes holes 82 for receiving a shaft (not shown) capable of holding a roll of plastic film to be used in making the foam-in-bag cushions. The foam-in-bag apparatus 88 further comprises an upper guide roller 77 and a lower guide roller 79 for moving the plastic film through the foam-in-bag apparatus 88 and maintaining alignment of the film. The perforating apparatus 10 is installed above the lower guide roller 79 through attachment of the frame plates 12 to the frame 80 of the foam-in-bag apparatus 88. The frame 80 of the foam-in-bag apparatus 88 further comprises a hole 78 through which an actuator, such as the rotary solenoid 20, can engage the main shaft 18, thereby allowing for rotation of the main shaft 18 and subsequent movement of the needle roller 35 into and out of an operative position.

The foam-in-bag apparatus 88 further comprises a housing 85, in which the electrical and computer components of the machine are maintained. According to a preferred embodiment of the present invention, the actuating means, preferably a rotary solenoid 20, are controlled by the same electronics and computer software used to run the foam-in-bag apparatus 88. This allows for the perforating apparatus 10 to be fully automated. The above disclosure of the incorporation of the perforating apparatus 10 into an apparatus for preparing foam-in-bag cushions is not intended to limit the ways in which the perforating apparatus 10 can be incorporated or the type of cushion preparation apparatus into which the perforating apparatus 10 can be incorporated. Various apparatuses for forming foam cushions are known, such as those disclosed in U.S. Pat. No. 6,131,375 (assigned to Sealed Air Corporation) and U.S. Pat. No. 5,679,208 (assigned to Sealed Air Corporation), both of which are incorporated herein in their entirety. The present invention fully contemplates incorporation of the perforation apparatus 10 into foam cushion producing apparatuses, such as those described in the above incorporated patents, as well as other similar apparatuses. Further, the present invention contemplates the incorporation of the perforating apparatus 10 into other types of apparatuses wherein perforation of a plastic film would be useful.

According to an especially preferred embodiment of the present invention, the actuating means are a rotary solenoid 20 that is coupled to the main shaft 18 and energized and controlled with the electrical and computer components of the apparatus to which it is attached. The rotary solenoid 20 is designed such that when it is energized, rotation of the solenoid key shaft 22 causes rotation of the main shaft 18 through part of a revolution, moving the needle roller 35 through a predetermined arc of motion. At the end of the predetermined arc of motion, the needle roller 35 is adjacent to the backup roller 50, forming a nip 70 therewith and perforating the film passing through the nip 70. In this state, the needle roller 35 is said to be in the operative position. When power to the rotary solenoid 20 is interrupted, the rotation of the main shaft 18 is disengaged, allowing the needle roller 35 to move back along the predetermined arc of motion to a point away from the backup roller 50 where perforation of the film is stopped. In this state, the needle roller 35 is said to be in the inoperative position. Such movement of the needle roller 35 between the operative and inoperative positions can be performed manually. Advantageously, however, the movement of the needle roller 35 between the operative and inoperative positions can also be fully automated, being controlled by the electrical and computer components of the apparatus to which the perforating apparatus 10 is attached.

Such fully automated control of the perforation of the film is a distinct advantage of the perforating apparatus 10 of the present invention. Foam-in-bag cushion making apparatuses, such as the SpeedyPacker™, are generally designed to allow for the production of multiple types and sizes of cushions. For example, single bags can be prepared, wherein a bag having the bottom and side edges sealed is filled with foam-forming materials before having the top edge sealed and simultaneously cut, freeing the single bag from the remaining sheet of plastic film. Such single bags are commonly referred to as wet bags. The width of the wet bags is dependent upon the width of the roll of plastic film being used. Common widths for use with the SpeedyPacker™ are 8, 12, and 19 inches. The length of the bag is determined by the machine operator and can vary depending upon the specific application. Wet bags are generally only vented in the upper portions of the bag. Therefore, any perforation apparatus used in venting wet bags should advantageously be capable of creating perforations in a specific portion of the bag rather than along the entire length of the bag.

An alternate use of the foam-in-bag cushion apparatus is in the production of continuous foam tubes (CFTs). A CFT is a length of multiple foam-filled bags that are still connected, the bags comprising the CFT being generally smaller in size than a typical wet bag. For example, a typical CFT pattern using 19-inch wide film would comprise bags that are approximately five inches in length. A CFT is prepared similarly to a wet bag with the exception that when the top of the bag is sealed after introduction of the foam-forming components, it is not cut free from the remaining length of plastic film. Instead, the bag remains attached to the advancing plastic film and another bag is formed immediately thereafter (i.e., the bottom seal for the next bag is made immediately above the top seal of the previous bag). In this manner, a series of interconnected foam-filled bags is produced, wherein the foam-filled bags are connected by lengths of plastic film that are not foam filled. Typically, the length of film connecting the foam-filled bags is between about 0.25 inches and about 1 inch but can be greater or less than this range depending upon the specified use. The optimal length of non-foam-filled film connecting the foam-filled bags for a given specified use would be recognizable to one of ordinary skill in the art.

The perforating apparatus 10 of the present invention, particularly due to its ability to be fully automated, creates the proper amount of venting for any size wet bag, letting gas and air pass into and out of the bag while preventing foam from escaping. The apparatus 10 also creates the proper venting for CFTs, which, unlike wet bags, need venting for their entire length to form properly. Because the apparatus 10 is fully automated, it can accommodate any pack at any time and in any combination. Because the actuating means, such as the rotary solenoid 20, are capable of being controlled by the same electronics and computer software as the foam-in-bag cushion making apparatus, the solenoid 20 can be controlled as an integral component of the foam-in-bag cushion making apparatus. Therefore, the perforating apparatus 10 can function in synchronism with the foam-in-bag cushion making apparatus providing the precise amount of perforating necessary for the size, shape, and type of bag being produced, regardless of the possible combinations (i.e., wet bag, CFT, wet bag, wet bag, CFT, etc.). Further, the perforating apparatus 10 can be left in its operative position for long stretches at a time to accommodate CFTs or it can be used intermittently, such as with wet bags.

Given the versatility of the perforating apparatus 10 as described above, there is provided in another aspect of the present invention a method for preparing foam-in bag cushions. The method comprises supplying at least one web of film and manipulating the film such that two film portions are in an overlying position, opposite one another. The method further comprises sealing the edges of the opposing film portions to form a bag with an interior space capable of receiving a foam-forming material and having one open side for receiving the material. The opposing film portions can be formed from a single web of film, manipulated to form overlying portions, or, preferably, from two webs of film supplied simultaneously to be adjacent and in opposition to one another. Means for sealing the edges of the film thereby forming a bag with the edges with the exception of one edge can be any means readily envisioned by one of skill in the art. In one particularly preferred embodiment, the sealing means are such that the sealing of the top edge of one bag simultaneously forms the bottom seal of the next bag.

The method of the present invention further comprises injecting a foam-forming composition into the interior space of the bag, and sealing the film portions along the one side of the bag left open to enclose the foam-forming composition in the bag. The foam-forming composition can be comprised of multiple components, which can be mixed prior to injection into the bag. In one particularly preferred embodiment, the foam-forming composition is comprised of at least two components injected as separate streams into the bag, such that the mixing of the components takes place in the bag.

The method also includes the step of perforating the bag to form vents. The perforating step comprises advancing the web of film between at least one freely rotatable backup roller 50 and at least one freely rotatable needle roller 35, wherein the needle roller 35 is supporting a plurality of pins 37 for perforating the film. This step further comprises moving the needle roller 35 from an inoperative position, spaced apart from the backup roller 50 such that the pins 37 are disengaged from the film, into an operative position adjacent the backup roller 50 such that the pins 37 engage the film and perforate the film. The configuration of the perforating apparatus 10 for completing this step of the method is shown in FIG. 4, wherein the needle roller 35 is shown adjacent to the backup roller 50, forming a nip 70 therewith through which the web of film passes. The passage of the web of film through the nip 70 causes the film to be engaged by the pins 37 of the needle roller 35 leading to perforation of the film and rotation of the needle roller 35. When perforation is no longer desired, the needle roller 35 can be moved to the inoperative position, away from the backup roller 50, such that the film, while still in contact with the backup roller, is no longer in contact with the pins 37 of the needle roller 35, thereby interrupting the perforating of the film.

In a preferred embodiment of the above method, the movement of the needle roller 35 into and out of the operative position wherein the pins 37 of the needle roller 35 are in contact with and perforating the film, is fully automated. The automation is accomplished through the use of a rotary solenoid 20 having a solenoid shaft 22, which engages a socket 75 in a shaft cap 60 attached to the main shaft 18. Engagement of the rotary solenoid 20 causes the main shaft 18 to rotate through part of a revolution, moving the needle roller 35 through a predetermined arc of motion. At the end of the predetermined arc of motion, the needle roller 35 is adjacent to the backup roller 50, forming a nip 70 therewith and perforating the film passing through the nip 70. Engagement of the rotary solenoid 20 is fully automated in that it is controlled by the electrical and computer components of the foam-in-bag cushion production apparatus to which the perforating apparatus 10 is attached. Once engaged, the needle roller 35 can be left in the operative position for long or short stretches of time, and the perforating of the film can be interrupted by disengaging the needle roller 35 and moving it to the inoperative position. Allowing such movement of the needle roller 35 into and out of the operative positions is advantageous in that the interrupting of the perforating of the advancing film can be conducted in synchronism with the advancement of the film so as to position the vents created by the needle roller 35 in a predetermined location with respect to the bag.

The present invention further encompasses a method for perforating foam-in-bag cushions. The method comprises supplying at least one web of film, manipulating the film to position two film portions in overlying opposition to each other, and sealing the two film portions along seal lines to form a bag open along one side and defining an interior space therein. The method further comprises injecting a foam-forming composition into the interior space of the bag, and sealing the film portions along the open side of the bag to enclose the foam-forming composition in the bag. Next, according to the method, the bag is perforated to form vents, wherein the perforating comprises the steps of advancing the web of film between at least one freely rotatable backup roller 50 and at least one freely rotatable needle roller 35 supporting a plurality of pins 37 for perforating the film, and moving the needle roller 35 from an inoperative position, spaced apart from the backup roller 50 such that the pins 37 are disengaged from the film, into an operative position adjacent the backup roller 50 such that the pins 37 engage the film and perforate the film.

A particularly advantageous feature of the perforating apparatus 10 of the present invention is its ability to form various shapes and patterns of perforations. Thus, one perforation pattern can be set for wet bags while another pattern is set for CFTs, and both types of bags can be produced on the same machine without modifying the machine, even when the production scheme is varied. This versatility is due in part to the ability of the movement of the needle roller 35 between the operative and inoperative positions to be performed automatically and under computer control. In other words, the engagement of the needle roller 35 with the backup roller 50, and subsequently of the pins 37 of the needle roller 35 with the film, can be controlled such that the engagement is of the precise length of time to produce the exact amount of perforations desired. For example, a single machine having the perforating apparatus 10 installed could be set to produce wet bags of a given size having perforations in a precise area of the bag (such as the top half of the bag or the top left quadrant of the bag) and also be set to produce CFTs having perforations along the entire length and width of the bags. The formation of the perforations is precisely controlled because the computer is engaging and disengaging the needle roller 35 at the precise time to perforate only where perforations are desired.

Another advantage to the perforation apparatus 10 of the present invention lies in the number of needle rollers 35 incorporated in the apparatus 10. The perforation apparatus 10 is comprised of at least one needle roller 35, preferably more than one, and most preferably two needle rollers 35.

The versatility of the perforation apparatus 10 is also due to the physical formation of the needle roller 35 and the pins 37. The type, spacing, and amount of perforations made by the needle roller 35 can be altered by variations in the pins 37. Preferably, the pins 37 are evenly spaced on the face of the needle roller 35 forming a repeating pattern. For example, in one preferred embodiment, there are five rings of pins 37 encircling the needle roller 35, wherein the rings are evenly spaced apart, an each ring contains a number of pins 37 wherein the distance between the pins 37 in each ring is equivalent to the distance between the pins 37 in adjacent rings. If fewer perforations were necessary, a different needle roller 35 having fewer pins 37 more widely spaced could be used. Alternately, if more perforations were desired, a different needle roller 35 having more pins 37 more closely spaced could be used. In yet another variation, the pins 37 could be removedly mounted on the needle roller 35 such that more pins 37 could be added to make more perforations, and, alternately, pins 37 could be removed to make fewer perforations. One method for accomplishing this embodiment could be by providing a needle roller 35 with a number of threaded holes whereby pins 37 having threaded shafts could be screwed into the threaded holes until the desired number of pins 37 and desired pattern is achieved.

Variations to the perforation created by the perforating apparatus 10 can also be due to changes to the pins 37 themselves. According to a preferred embodiment of the present invention, the pins 37 are metallic in nature and shaped such that they have their greatest width at the base where the pins 37 are in contact with the needle roller 35 and are subsequently tapered outward from the needle roller 35 ending in a sharp point. Other formations for the pins could be readily envisaged by one of skill in the art, and could include alterations, such as the pins 37 having a uniform diameter along the majority of their length and tapering to a sharp point only near the tip of the pins 37. Further, it is preferred that the pins 37 be constructed of hardened steel as it is necessary that the pins 37 have sufficient strength to perforated multiple layers of plastic film, sufficient durability to function properly for extended lengths of time without needing replacement, and be capable of withstanding possible contact with the foam-forming materials in regard to chemical resistance and non-sticking ability. Other materials meeting the above requirements, such as, for example, stainless steel, could also be used and would be recognizable to one of ordinary skill in the art.

The backup roller 50 is also subject to alterations consistent with the various uses of the perforating apparatus 10 of the present invention. In a preferred embodiment, the backup roller 50 is comprised of a hard polymer material having grooves 52 surrounding the circumference of the backup roller 50 and spaced along the width of the backup roller to correspond to the row of pins 37 on the needle roller 35. The grooves 52 are designed for receiving the pins 37 on the needle roller 35 as the pins 37 perforated and pass through the film moving between the backup roller 50 and the needle roller 35. An especially preferred material for constructing the backup roller is Delrin®, a low wear, low friction acetal resin available from Dupont. Backup rollers 50 comprised of different materials can also be used according to the present invention. For example, the backup roller 50 could be comprised of a brush-like material, preferably stiff in nature, capable of supporting the film and receiving the pins 37 as they perforate the film. Further, the backup roller 50 could be comprised of a durable sponge or foam-like material, again capable of supporting the film and receiving the pins 37 as they perforate the film. Other types of material and backup roller 50 construction could be used according to the present invention and as such would be readily recognizable to one of skill in the art.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An apparatus for perforating an advancing plastic film, comprising:
    a frame;
    a main shaft mounted in the frame so as to be rotatable through a partial revolution about a central axis of the main shaft;
    at least one needle roller coupled to the main shaft in radially offset position therefrom by being mounted on a secondary shaft fixedly mounted to the main shaft with a pair of arms, wherein the arms extend radially out from the axis of the main shaft, such that rotation of the main shaft through said partial revolution moves the at least one needle roller through a predetermined arc of motion, the at least one needle roller being arranged to be feely rotatable about an axis of the secondary shaft upon which the at least one needle roller is mounted independently of the rotation of the main shaft; and
    an actuator coupled with the main shaft and operable to rotate the main shaft through said partial revolution so as to move the at least one needle roller through said arc of motion such that at one end of said arc of motion, the at least one needle roller is in an operative position, adjacent the advancing film, engaging and perforating the film, and at an opposite end of said arc of motion, the at least one needle roller is in an inoperative position, spaced apart from the advancing film.

2. The apparatus of claim 1, wherein the frame comprises a pair of frame plates spaced apart, opposite one another.

3. The apparatus of claim 2, wherein the frame farther comprises a support bar connecting the frame plates.

4. The apparatus of claim 2, wherein the main shaft extends between the frame plates.

5. The apparatus of claim 1, wherein the at least one needle roller is comprised of a cylindrical body with a center bore and pins extending out radially from the body.

6. The apparatus of claim 5, wherein the pins are tapered outward from the body.

7. The apparatus of claim 1, further comprising a needle roller cover.

8. The apparatus of claim 7, wherein the cover limits outside contact with the at least one needle roller at all points through said predetermined arc of motion.

9. The apparatus of claim 1, further comprising at least one backup roller mounted in the frame so as to be freely rotatable about an axis of the at least one backup roller.

10. The apparatus of claim 9, wherein the at least one backup roller is radially offset from the main shaft, positioned such that when the at least one needle roller is in the inoperative position, the at least one needle roller is spaced apart from the at least one backup roller, and when the at least one needle roller is in the operative position, the at least one needle roller is adjacent the at least one backup roller forming a nip therewith, through which nip the advancing film passes, the at least one needle roller in the operative position engaging the advancing film against the at least one backup roller and perforating the advancing film.

11. The apparatus of claim 9, wherein the at least one backup roller further comprises grooves.

12. The apparatus of claim 1, wherein the actuator is a rotary device.

13. The apparatus of claim 12, wherein the rotary device is a solenoid.

14. The apparatus of claim 1, wherein the apparatus is structured and arranged for attachment to a foam-in-bag cushion production apparatus.

15. The apparatus of claim 1, wherein the apparatus comprises two needle rollers.

16. The apparatus of claim 9, wherein the apparatus comprises two backup rollers.

17. An apparatus for creating perforations over a defined area through a moving foam-in-bag film at any point along the length of the film, wherein the apparatus comprises:
   a pair of frame plates spaced apart opposite one another;
   a main shaft extending between the frame plates and mounted so as to be rotatable through a partial revolution about a central axis of the main shaft;
   secondary shafts having central axes and being fixedly mounted to the main shaft in radially offset positions therefrom;
   needle rollers mounted on each of the secondary shafts so as to be freely rotatable about the secondary shafts, said needle rollers each comprising a cylindrical body with a center bore and pins extending out radially from the body;
   tertiary shafts cantilevered off each frame plate and having free ends;
   backup rollers mounted on each of said tertiary shafts such that the backup rollers are freely rotatable about the tertiary shafts; and
   means for rotating the main shaft through said partial revolution so as to move the needle rollers in a predetermined arc of motion between operative and inoperative positions in which the needle rollers are respectively in contact and out of contact with the backup rollers, whereby a film passing between the backup rollers and the needle rollers is perforated by the needle rollers when the needle rollers are in the operative position and is not perforated when the needle rollers are in the inoperative position.

18. The apparatus of claim 17, farther comprising a support bar connecting the frame plates.

19. The apparatus of claim 17, wherein each of the secondary shafts is mounted to the main shaft with a pair of arms, wherein the arms extend radially out from the axis of the main shaft.

20. The apparatus of claim 19, wherein the secondary shafts are mounted to the main shaft such that the axes of the secondary shafts are always in line with one another.

21. The apparatus of claim 19, wherein the axes of the secondary shafts are parallel to the axis of the main shaft.

22. The apparatus of claim 17, wherein the pins are tapered outward from the body.

23. The apparatus of claim 17, wherein the backup rollers comprise grooves in substantial alignment with the pins of the needle rollers.

24. The apparatus of claim 17, farther comprising a support bar connecting the free ends of the tertiary shafts.

25. The apparatus of claim 17, farther comprising needle roller covers.

26. The apparatus of claim 25, wherein the covers limit outside contact with the needle rollers while said rollers are in or out of contact with the backup rollers and at any point in between.

27. The apparatus of claim 17, wherein the means for rotating the main shaft comprise a rotary device.

28. The apparatus of claim 27, wherein the rotary device is a solenoid.

29. The apparatus of claim 17, wherein the apparatus is structured and arranged for attachment to a foam-in-bag cushion production apparatus.

* * * * *

UNITED STATES PATENT AND TRADEMARK OFFICE
CERTIFICATE OF CORRECTION

PATENT NO. : 7,160,096 B2 Page 1 of 1
APPLICATION NO. : 10/692579
DATED : October 24, 2003
INVENTOR(S) : Knaak et al.

It is certified that error appears in the above-identified patent and that said Letters Patent is hereby corrected as shown below:

Column 12,

Line 64: "farther" should read --further--

Column 14,

Line 17: "farther" should read --further--

Column 14,

Line 35: "farther" should read --further--

Column 14,

Line 37: "farther" should read --further--

Signed and Sealed this

Eighth Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 7,160,096 B2  Page 1 of 1
APPLICATION NO. : 10/692579
DATED : January 9, 2007
INVENTOR(S) : Knaak et al.

It is certified that error appears in the above-identified patent and that said Letters Patent is hereby corrected as shown below:

Column 12,

Line 64: "farther" should read --further--

Column 14,

Line 17: "farther" should read --further--

Column 14,

Line 35: "farther" should read --further--

Column 14,

Line 37: "farther" should read --further--

This certificate supersedes Certificate of Correction issued May 8, 2007.

Signed and Sealed this

Twenty-ninth Day of May, 2007

JON W. DUDAS
*Director of the United States Patent and Trademark Office*